US006886175B2

(12) United States Patent
Yeh et al.

(10) Patent No.: US 6,886,175 B2
(45) Date of Patent: Apr. 26, 2005

(54) COLLAPSIBLE LOCKING MECHANISM FOR AN OPTICAL DISK READING DEVICE

(75) Inventors: Shih-Lin Yeh, Taoyuan (TW); Yi-Feng Lin, Taipei (TW); Jui-Nan Chuang, Hsinchu Hsien (TW); Han-Chou Chen, Hsinchu (TW)

(73) Assignee: Lite-On IT. Corp. (TW)

( * ) Notice: Subject to any disclaimer, the term of this patent is extended or adjusted under 35 U.S.C. 154(b) by 86 days.

(21) Appl. No.: 10/268,165

(22) Filed: Oct. 10, 2002

(65) Prior Publication Data

US 2003/0142610 A1 Jul. 31, 2003

(30) Foreign Application Priority Data

Jan. 30, 2002 (TW) .......................................... 91200997

(51) Int. Cl.[7] .............................................. G11B 17/03
(52) U.S. Cl. ..................................................... 720/610
(58) Field of Search ......................... 720/610; 360/75.1, 360/75.2

(56) References Cited

FOREIGN PATENT DOCUMENTS

JP          08235717 A  *  9/1996  .......... G11B/17/04

* cited by examiner

Primary Examiner—David Davis
(74) Attorney, Agent, or Firm—Raymond Sun

(57) ABSTRACT

A locking mechanism for a disk reading device has a body, and an absorber provided on the body for absorbing impact energy. The absorber can be implemented in the form of an elastic material on the body of the locking mechanism, or by providing one or more hollowed regions on the body of the locking mechanism, or by providing resilient members that function to further absorb the impact energy.

5 Claims, 8 Drawing Sheets

COLLAPSIBLE LOCKING MECHANISM FOR AN OPTICAL DISK READING DEVICE

BACKGROUND OF THE INVENTION

1. Field of the Invention

The present invention relates to an optical disk reading device, and in particular, to a collapsible locking mechanism that is more effective in resisting the impact of shock that may be experienced by the optical disk reading device.

2. Description of the Prior Art

Optical disk reading devices are becoming increasingly popular as storage media devices. Optical disk reading devices, such as thin-type CD drives, are low in cost and can store large amounts of data having different contents, including music, video, programs, and information data.

Weight and space are important considerations in the design of thin-type CD drives. The biggest challenge is how to fit all the necessary components of the CD drive into a limited space.

In one attempt to reduce cost and to adapt to the limited space constraints, the conventional motor drive for loading and unloading a compact disk (CD) has been eliminated, and a manual loading and ejection device is used to facilitate the loading and unloading operation. FIGS. 1–5 illustrate a conventional CD drive and its manual loading and ejection device. The conventional CD drive has a chassis 1, a tray 2 and a playback unit 3. The tray 2 and the playback unit 3 are located inside the chassis 1, and the playback unit 3 is positioned above the tray 2, with the tray 2 acting as a supporting device for a CD. When the tray 2 is ejected, the user can place a CD on the tray 2 and push the tray 2 back into the CD drive. A locking mechanism 4 then functions to lock the tray 2 to prevent it from being inadvertently ejected when the CD drive is in use.

The conventional locking mechanism 4 is positioned on the tray 2 and inside the chassis 1. The conventional locking mechanism 4 is typically made of a solid piece of an inelastic material. The locking mechanism 4 has an axis 5 that extends through an axle hole 6 on the locking mechanism 4. A shaft can be retained in the axle hole 6 along the axis 5 and pivotably connects the locking mechanism 4 to the tray 2 so as to define a pivot axis about which the body of the locking mechanism 4 can pivot. The tray 2 and the locking mechanism 4 carried thereon are adapted to slide in and out of the CD drive along the axis X (see FIGS. 1 and 5).

A locking member 7 is secured to a fixed location on the chassis 1. When the tray 2 is pushed into the CD drive, a front end 8 of the locking mechanism 4 will abut the locking member 7, thereby locking the tray 2 inside the CD drive. To eject the tray 2, the user actuates another element (not shown, but can be a switch or other actuating mechanism) which causes the locking mechanism 4 to rotate about its pivot axis 5 so as to release the engagement between the front end 8 and the locking member 7, so that the locking mechanism 4 can slide past the locking member 7 to allow the tray 2 to be slid out of the CD drive. The locking mechanism 4 can also be provided with a prod extension 41 adjacent the front end 8 so that the user can use a thin wire or other similar mechanism to push or prod the prod extension 41 to cause the locking mechanism 4 to rotate about its pivot axis 5 so as to release the engagement between the front end 8 and the locking member 7. Thus, the prod extension 41 functions as an emergency ejection mechanism.

Unfortunately, when the CD drive is being transported (either by the manufacturer, the retailer or the user) from one location to another, shock and other related forces are inevitable. In this regard, if the force is exerted in the direction of arrow X in FIGS. 1 and 5 (e.g., if the tray 2 is dropped vertically in the direction of the arrow X), the shock energy of the force will be absorbed by the locking mechanism 4 (that is fixed to the tray 2) and the locking member 7 (that is fixed to the chassis 1), and in particular, the front end 8 and the locking member 7. It has been noticed that if this force and the resulting shock energy is too large, then the locking mechanism 4 might fracture or break because of the inelastic and solid nature of the body of the locking mechanism 4. Once the locking mechanism 4 is broken, the tray 2 will slide down, and cannot be locked inside the CD drive, thereby rendering the entire CD drive unusable.

Thus, there remains a need to provide a locking mechanism that is simple in construction, small in size, and capable of withstanding strong impact forces without experiencing breakage.

SUMMARY OF THE DISCLOSURE

It is an object of the present invention to provide a locking mechanism for an optical disk reading device that can effectively withstand strong impact forces.

It is another object of the present invention to provide a locking mechanism for an optical disk reading device that is simple in construction.

It is yet another object of the present invention to provide a locking mechanism for an optical disk reading device that has a sufficiently small size to be accomodated for use in a thin-type CD drive.

In order to accomplish the objects of the present invention, the present invention provides a locking mechanism for a disk reading device. The locking mechanism has a body, and an absorber provided on the body for absorbing impact energy. The absorber can be implemented in the form of an elastic material on the body of the locking mechanism, or by providing one or more hollowed regions on the body of the locking mechanism, or by providing resilient members that function to further absorb the impact energy.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with a pull-in type of compact disk (CD) drive, the present invention can be applied to all optical disk reading devices, including but not limited to CD drives, DVD drives, CD/DVD drives, DVD/RW combo drives, car audio drives, etc.

The present invention provides a locking mechanism that is more elastic than the conventional locking mechanism so that the locking mechanism is better suited to absorb the energy of strong impact forces, thereby becoming less prone to fracture or breakage. In particular, the present invention provides a locking mechanism that has a collapsible zone or area that is effective in absorbing the energy of strong impact forces.

Figure 6:
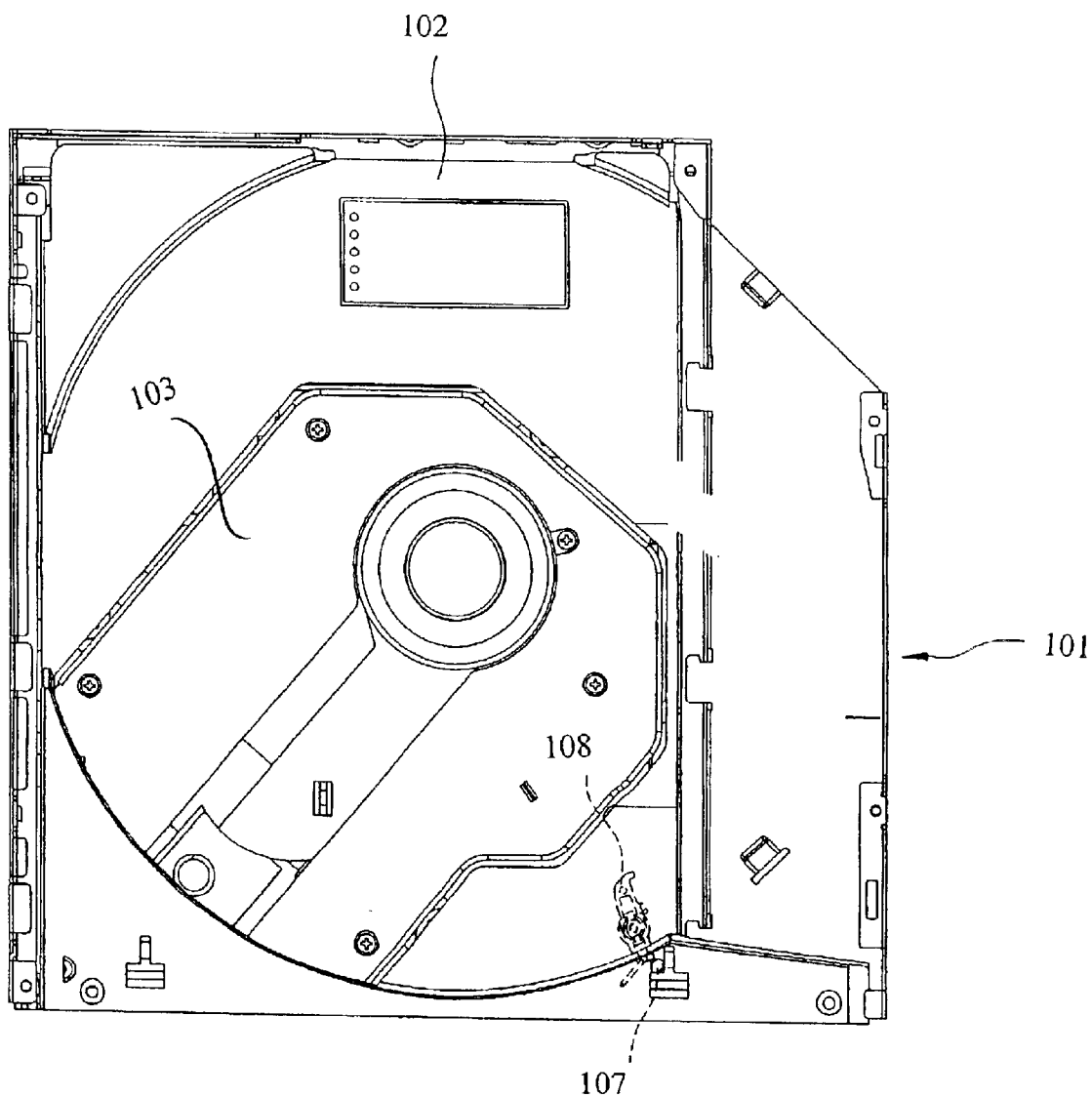
FIG. 6 is a top plan view of an optical disk reading device of the present invention shown with the top cover removed.
Figure 7:
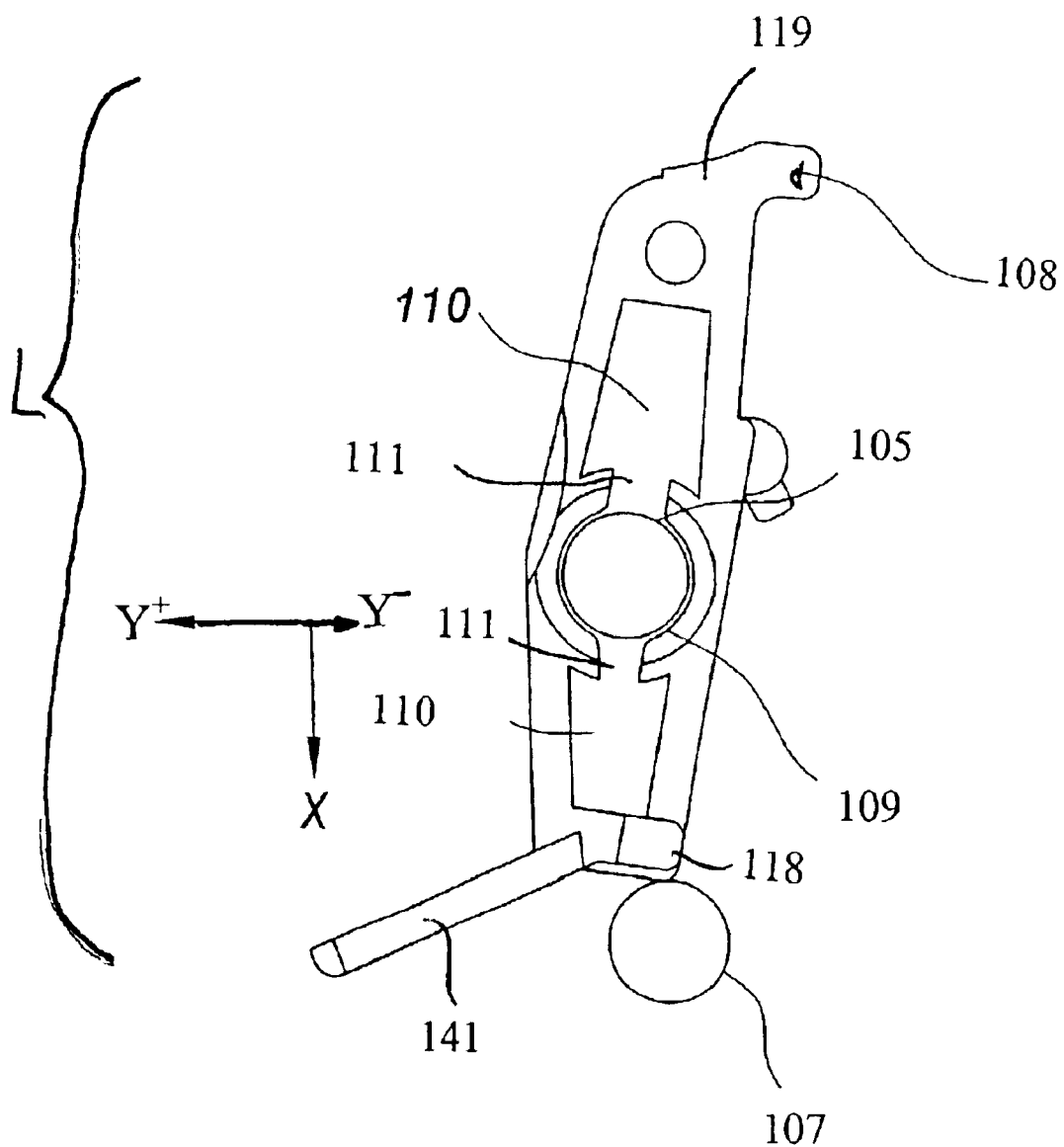
FIG. 7 is a top plan view of a locking mechanism according to one embodiment of the present invention.

Referring to FIGS. 6 and 7, the CD drive according to the present invention has a chassis 101, a tray 102 and a playback unit 103 that can be the same as the chassis 1, the tray 2 and the playback unit 3 for a conventional CD drive. The tray 102 and the playback unit 103 are located inside the chassis 101, and the playback unit 103 is positioned above the tray 102, with the tray 102 acting as a supporting device for a CD. When the tray 102 is ejected, the user can place a CD on the tray 102 and push the tray 102 back into the CD drive. The locking mechanism 108 of the present invention then functions to lock the tray 102 to prevent it from being inadvertently ejected when the CD drive is in use.

The locking mechanism 108 is positioned on the tray 102 and inside the chassis 101. The locking mechanism 108 is preferably made from an elastic material that is effective in absorbing the energy of strong impact forces, or cushioning the impact of the energy. Non-limiting examples of such materials include plastics, elastomers, sponges and deformable metals, among others. The locking mechanism 108 has a generally elongated configuration that can be the same as the conventional locking mechanism 4 described above, except for the differences noted herein. The locking mechanism 108 has an axis 105 that extends through a central axle hole 109 on the locking mechanism 108. A shaft can be retained in the axle hole 109 along the axis 105 and pivotably connects the locking mechanism 108 to the tray 102 so as to define a pivot axis about which the body of the locking mechanism 108 can pivot. The tray 102 and the locking mechanism 108 carried thereon are adapted to slide in and out of the CD drive along the axis X (see FIGS. 1 and 7).

A locking member 107 is also secured to a fixed location on the chassis 101, and operates in the same manner as the locking member 7 described above. Thus, when the tray 102 is pushed into the CD drive, a front end 118 of the locking mechanism 108 will abut the locking member 107, thereby locking the tray 102 inside the CD drive. To eject the tray 102, the user actuates another element (not shown, but can be a switch or other actuating mechanism that is well-known in the art) which causes the locking mechanism 108 to rotate about its pivot axis 105 so as to release the engagement between the front end 118 and the locking member 107, so that the locking mechanism 104 can slide past the locking member 107 to allow the tray 102 to be slid out of the CD drive. The locking mechanism 108 can also be provided with a prod extension 141 adjacent the front end 118 so that the user can use a thin wire or other similar mechanism to push or prod the prod extension 141 to cause the locking mechanism 108 to rotate about its pivot axis 105 so as to release the engagement between the front end 118 and the locking member 107. Thus, the prod extension 141 also functions as an emergency ejection mechanism.

One primary feature of the locking mechanism 108 of the present invention is the provision of an elastic feature that provides the body of the locking mechanism 108 with increased elasticity to better absorb the energy of strong impact forces. In the embodiment shown in FIG. 7, two hollowed regions 110 are provided on either side of the central axle hole 109. Each hollowed region 110 is essentially an opening provided in the body of the locking mechanism 108 that extends in the longitudinal direction of the locking mechanism 108, and has an open channel 111 that extends from the hollowed region 110 into the axle hole 109. As a result, the two hollowed regions 110 and the axle hole 109 combine to provide an elongated opened space that extends along a majority of the length L of the locking mechanism 108. Since the material of the body of the locking mechanism 108 is elastic, each hollowed region 110 forms a collapsible or deformable zone between each end 118 and 119 of the locking mechanism 108 and the central axle hole 109 to effectively absorb impact energy.

Figure 1:
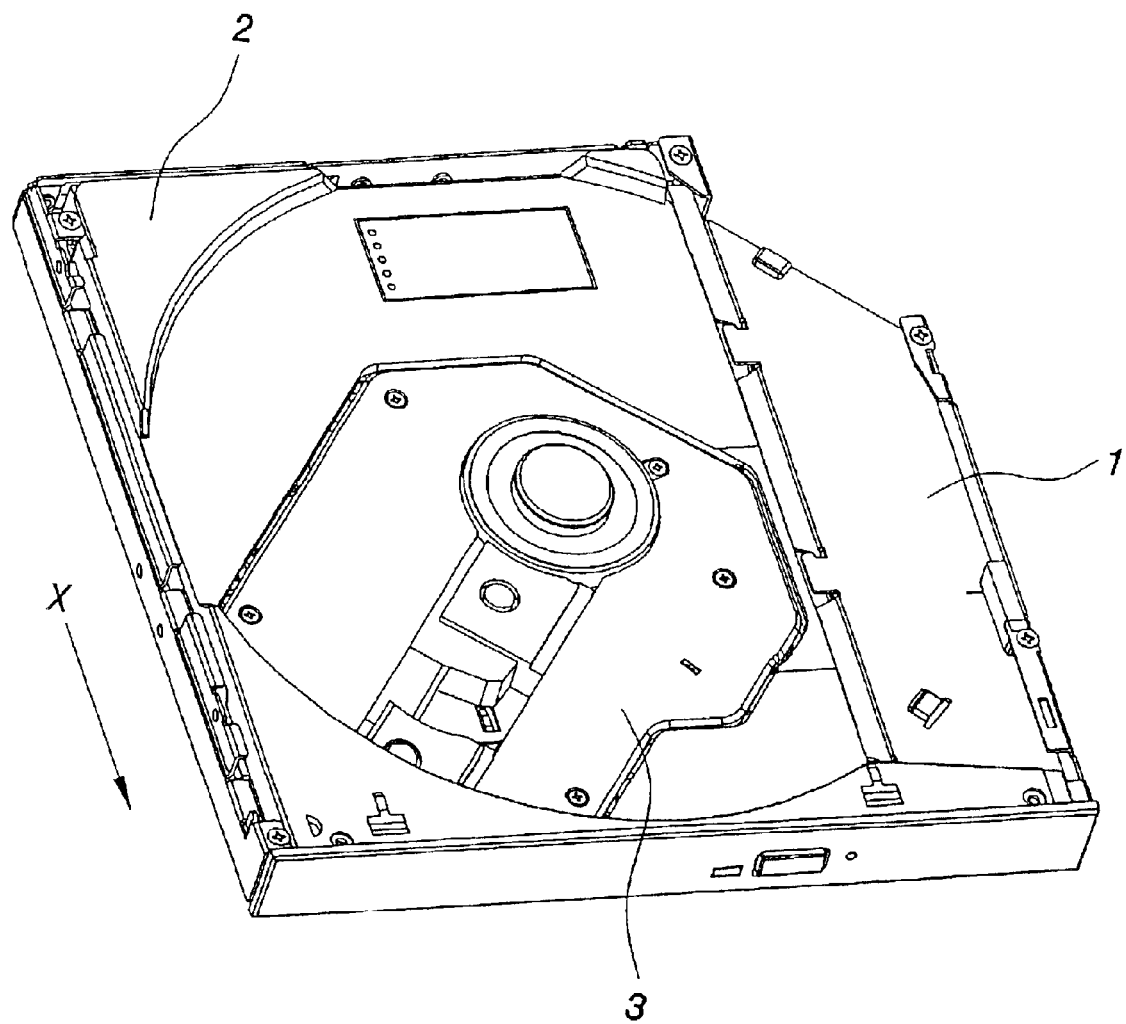
FIG. 1 is a top and opened perspective view of a conventional optical disk reading device.
Figure 2:
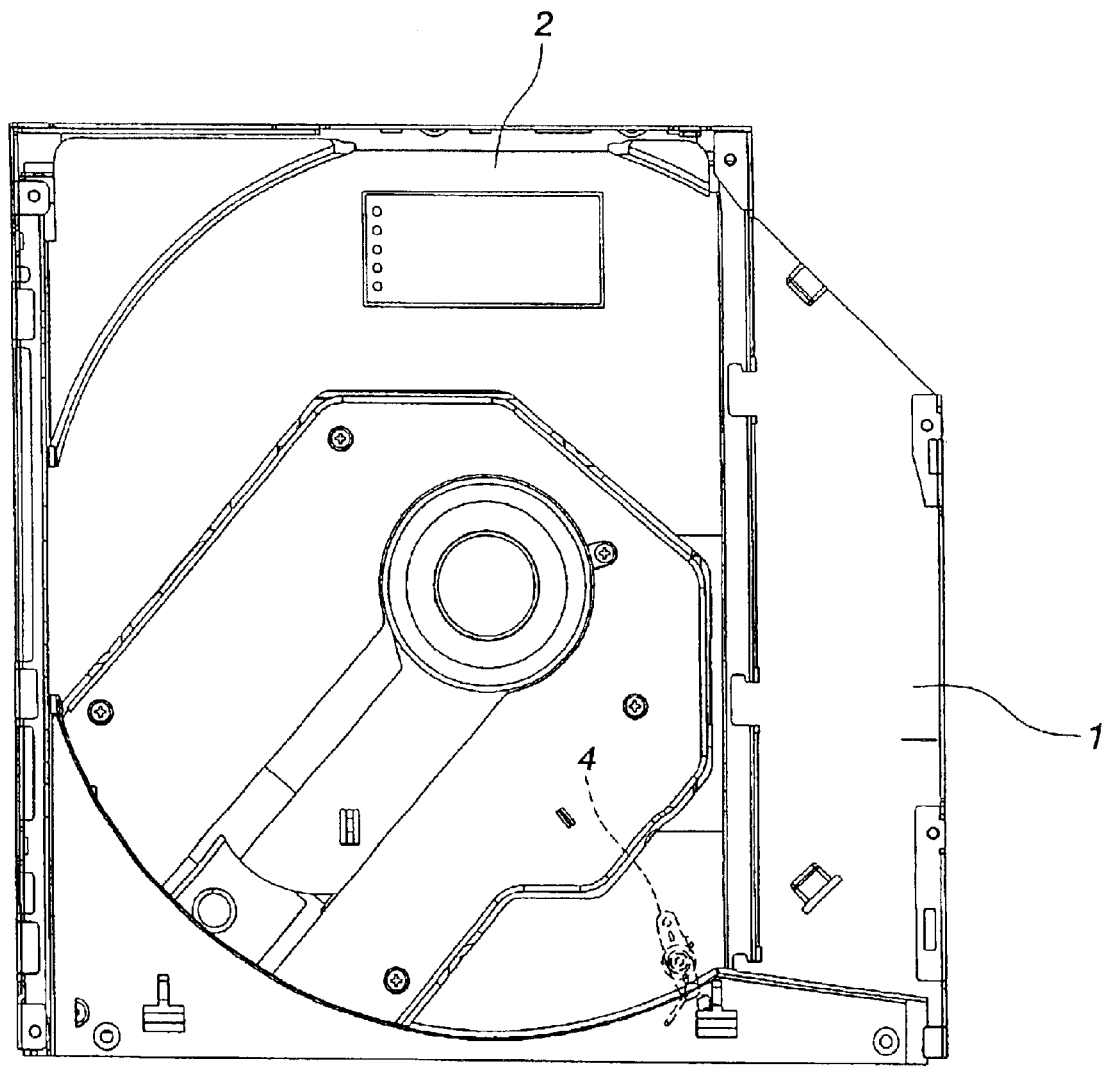
FIG. 2 is a top plan view of the device of FIG. 1 with the top cover removed.
Figure 3:
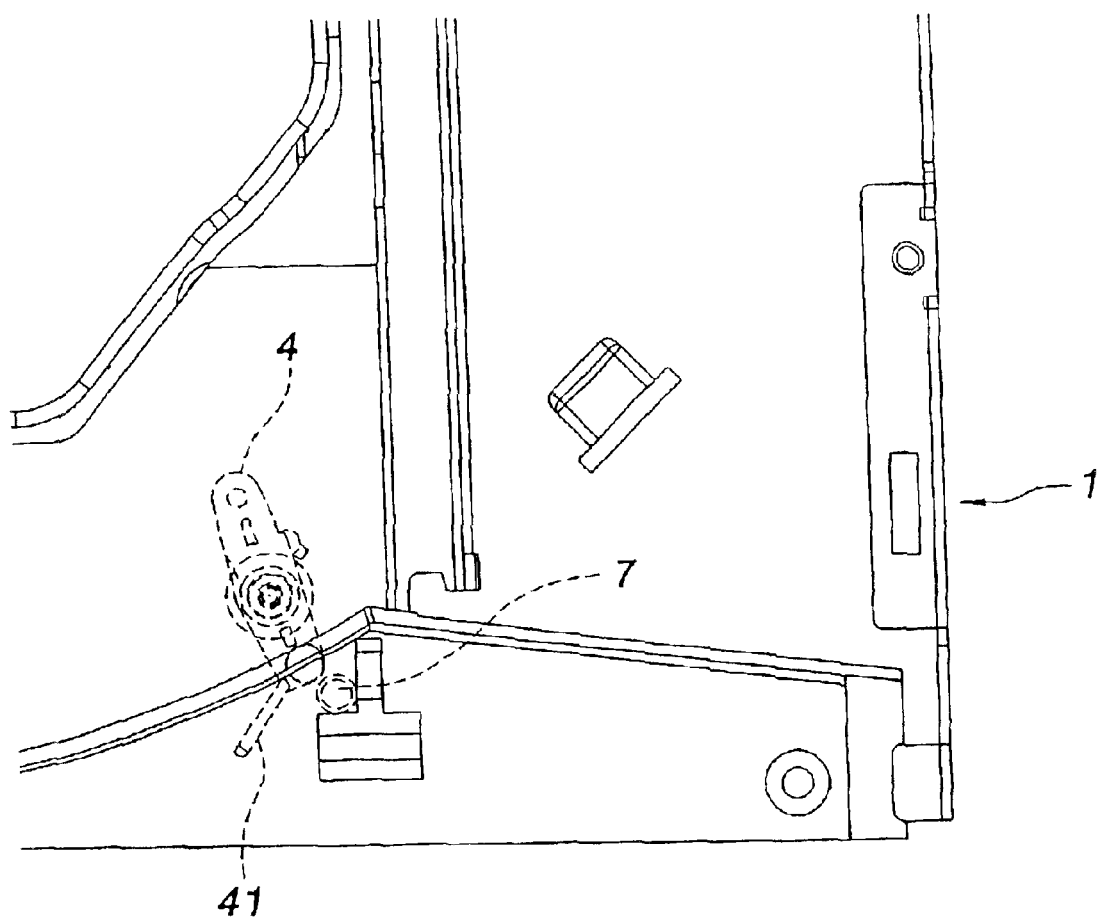
FIG. 3 is a top plan view of a portion of the device of FIG. 1 with the top cover removed, and showing the placement of the conventional locking mechanism.
Figure 4:
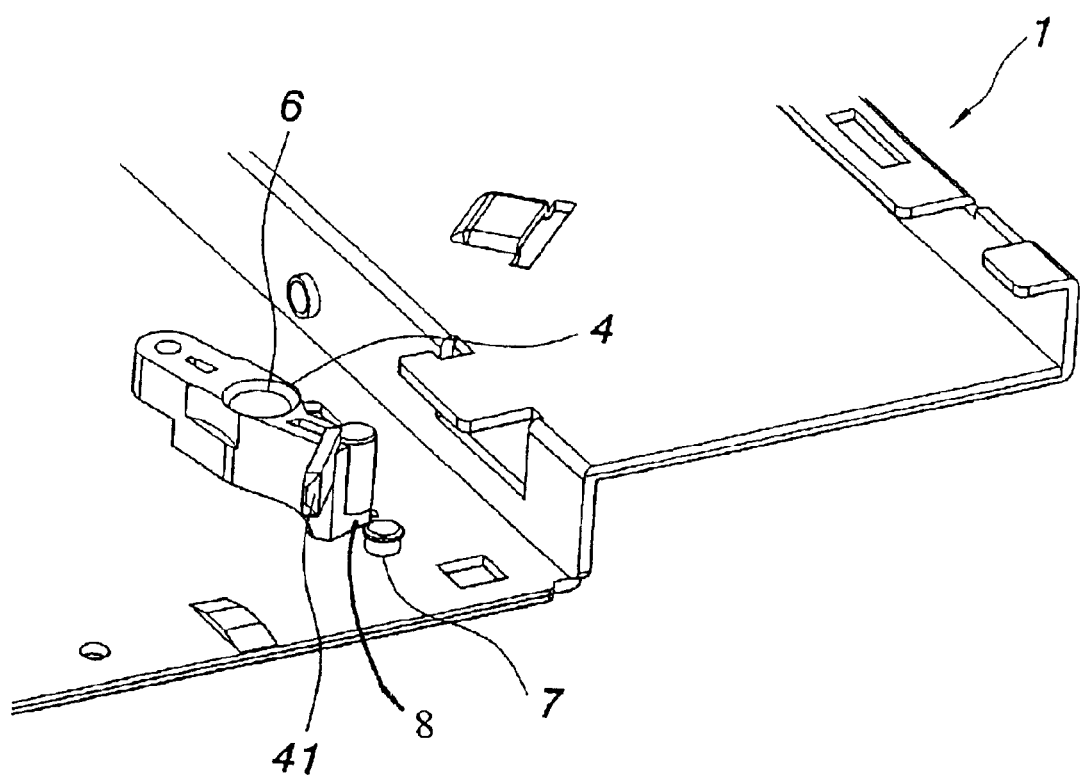
FIG. 4 is a perspective view of the portion illustrated in FIG. 3.
Figure 5:
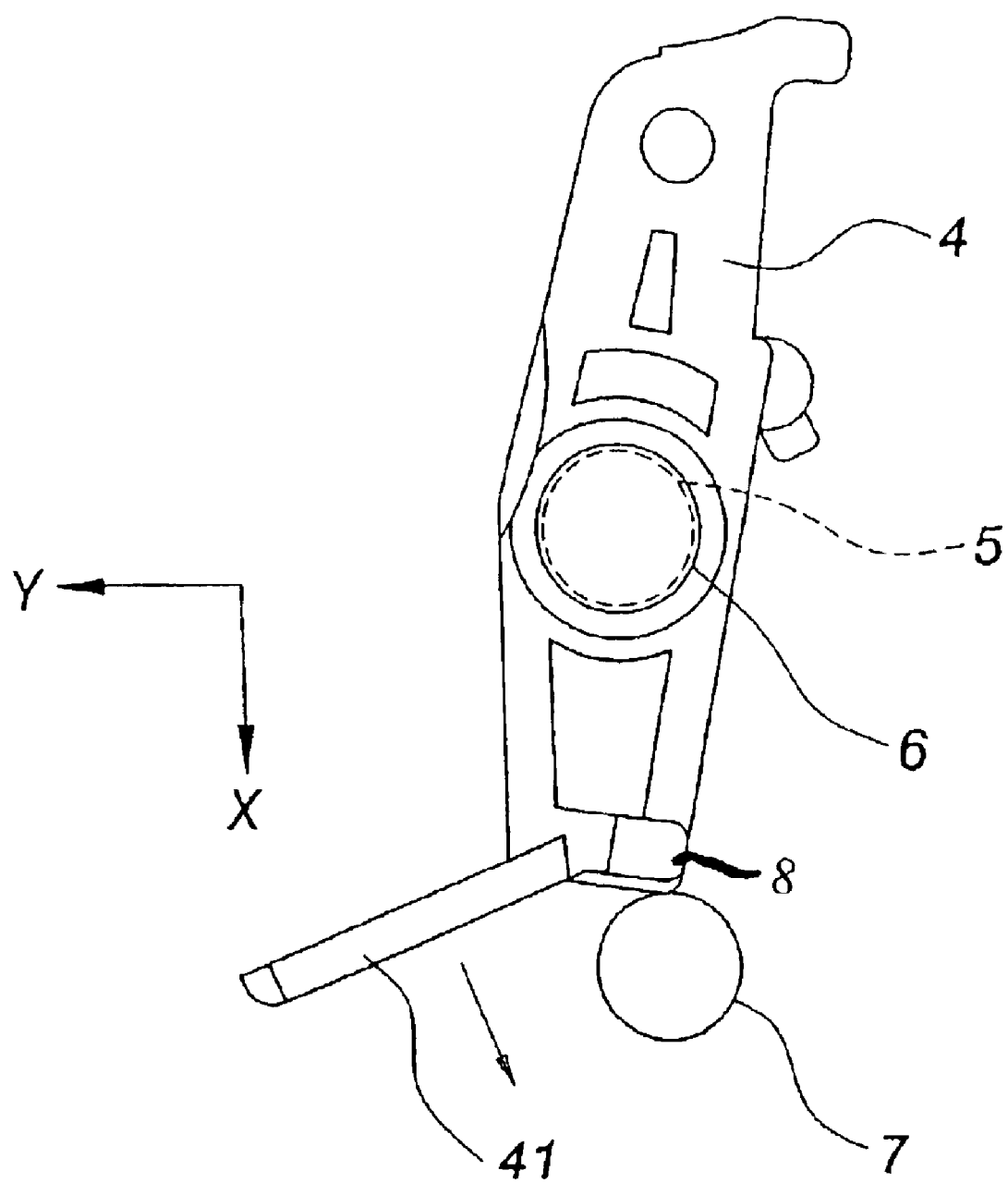
FIG. 5 is a top plan view of a conventional locking mechanism.

Thus, when a force is exerted in the direction of arrow X in FIGS. 1 and 7 (e.g., if the tray 102 is dropped vertically in the direction of the arrow X), the locking member 107 will exert an impact force on the locking mechanism 108 in the direction opposite to the arrow X. The shock energy of the force will be converted by the locking mechanism 108 into a pushing force on the axle hole 109. Since the material of the body of the locking mechanism 108 is elastic, the body of the locking mechanism 108 can change its form in the directions indicated by the arrows Y+ and Y− in order to absorb the impact energy, so that the body will not fracture or break. After the impact of the shock dissipates, the elasticity of the material will cause the body of the locking mechanism 108 to return to its original form.

Figure 8:
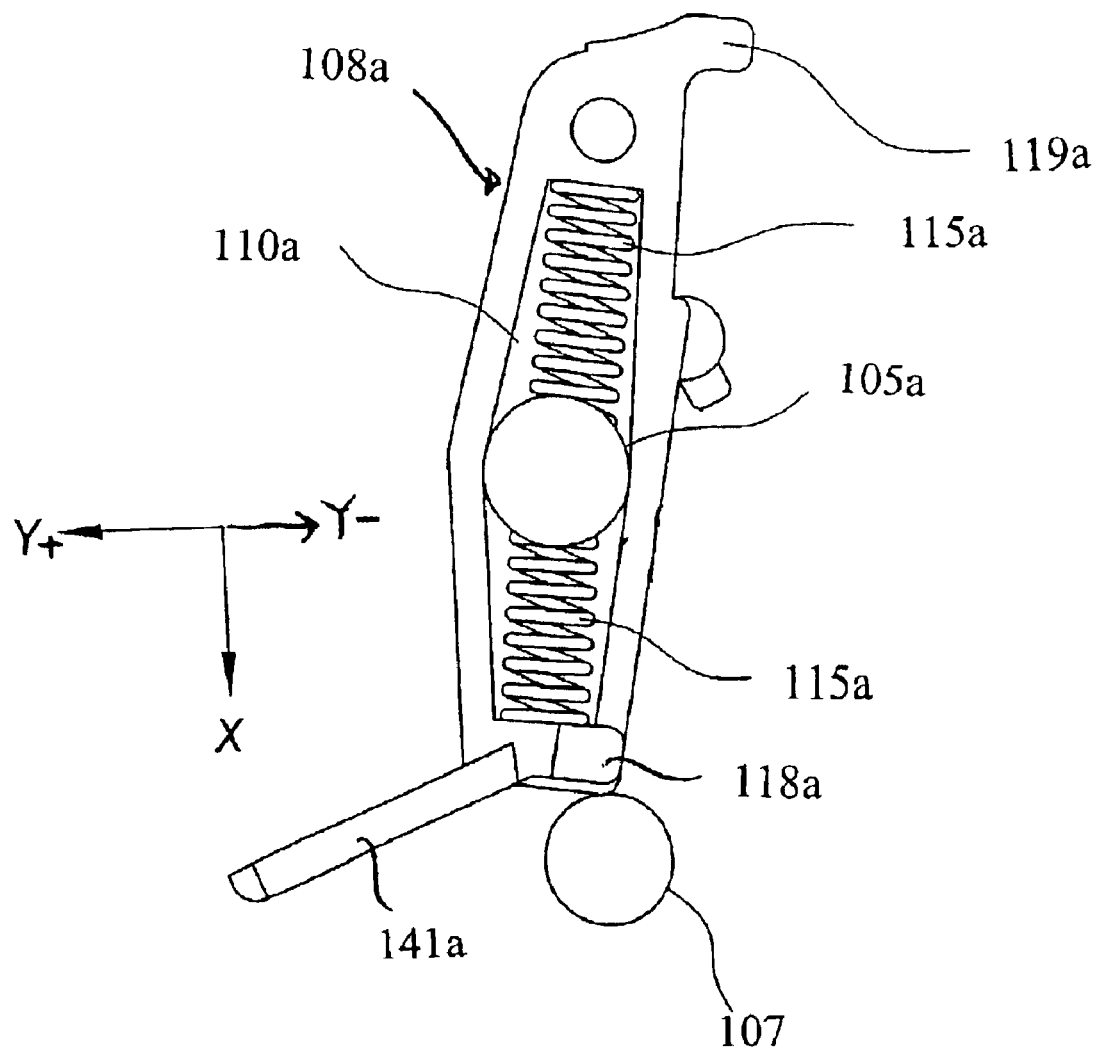
FIG. 8 is a top plan view of a locking mechanism according to another embodiment of the present invention.

FIG. 8 illustrates another embodiment of the locking mechanism 108 of FIG. 7, designated by the numeral 108a. The locking mechanism 108a also has the same outer configuration as the locking mechanism 108, and has opposing ends 118a and 119a. A prod 141a is also provided adjacent the front end 118a. The difference between the locking mechanisms 108 and 108a is that the locking mechanism 108a has one elongated hollowed region 110a, with the pivot axis 105a (which can receive a shaft) and two resilient members 115a provided in the hollowed region 110a. The pivot axis 105a (i.e., its shaft) is positioned between the two resilient members 115a. The resilient members 115a can be embodied in the form of any elastic and resilient element that can provide cushioning, such as rubber or a spring. The resilient members 115a function to further form the collapsible or deformable zone that absorbs the impact energy from any shock forces, allowing the body of the locking mechanism 108a to deform in the directions of the arrows Y+ and Y− so that the body will not fracture or break. Although the hollowed region 110a alone can be effective in absorbing the impact energy, the provision of the resilient members 115a can provide improved shock absorption.

As an alternative, the present invention can be implemented by providing the conventional locking mechanism 4 described above without any hollowed regions, but made instead completely from an elastic material so that the elasticity of the body of the locking mechanism 4 alone can absorb some of the impact energy.

Thus, the present invention provides locking mechanisms that have an elasticity for absorbing impact energy from shock forces. The elasticity can be provided in the form of an elastic material on the body of the locking mechanism, or by providing one or more hollowed regions on the body of the locking mechanism, or by providing resilient members that function to further absorb the impact energy.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A disk reading device, comprising:
   a tray;
   a chassis;
   a locking member positioned on the chassis; and
   a locking mechanism that engages the locking member, to lock the tray the locking mechanism having:
   a body made from an elastic material;
   an axle hole provided in the body for defining a pivot axis; and
   a hollowed region provided in the body and extending from the axle hole.

2. The apparatus of claim 1, wherein the hollowed region includes a first hollowed region and a second hollowed region, with the axle hole positioned between the first and second hollow regions.

3. The apparatus of claim 1, wherein the body is elongated.

4. The apparatus of claim 2, wherein body has a longitudinal dimension, and wherein the first and second hollowed regions extend for a majority of the longitudinal dimension of the body.

5. The apparatus of claim 1, wherein the locking mechanism further includes at least one resilient member provided in the hollowed region.

* * * * *